United States Patent
Wemyss

(10) Patent No.: US 6,306,237 B1
(45) Date of Patent: Oct. 23, 2001

(54) LAMINATION OF SURFACES USING PRESSURIZED LIQUID

(76) Inventor: Roy D. Wemyss, 29812 - 24th Ave. Southwest, Federal Way, WA (US) 98023

( * ) Notice: Subject to any disclaimer, the term of this patent is extended or adjusted under 35 U.S.C. 154(b) by 0 days.

(21) Appl. No.: 08/563,665

(22) Filed: Nov. 28, 1995

(51) Int. Cl.$^7$ .......... B32B 31/00; B32B 31/08; B32B 31/12; B32B 31/20
(52) U.S. Cl. .......... 156/199; 156/212; 156/285; 156/475; 156/477.1; 156/580; 156/583.91; 264/500; 264/510; 264/557; 264/570; 425/503; 425/387.1
(58) Field of Search .......... 156/199, 212, 156/214, 285, 475, 580, 583.91, 477.1; 264/500, 510, 557, 570; 425/503, 387.1

(56) References Cited

U.S. PATENT DOCUMENTS

| | | | | |
|---|---|---|---|---|
| 219,033 | * | 8/1879 | Stepp | 156/285 |
| 635,917 | * | 10/1899 | Church | 156/285 |
| 1,206,656 | * | 11/1916 | Benedictus | 156/580 X |
| 1,260,002 | * | 3/1918 | Lanhoffer | 156/580 X |
| 2,013,067 | * | 9/1935 | Reese | 156/285 X |
| 2,236,552 | * | 4/1941 | Ushakoff | 156/285 X |
| 2,342,988 | * | 2/1944 | Vidal | 156/285 X |
| 2,382,004 | * | 8/1945 | Curran | 156/580 X |
| 2,431,050 | * | 11/1947 | Kopplin | 156/285 X |
| 2,468,656 | * | 4/1949 | De Forest | 156/285 |
| 2,519,661 | * | 8/1950 | Johnson | 156/580 X |
| 4,010,057 | * | 3/1977 | Nakanishi | 156/285 X |
| 4,265,102 | * | 5/1981 | Shimakata et al. | 264/570 X |
| 4,428,789 | * | 1/1984 | Masaaki et al. | 156/285 X |
| 4,437,921 | * | 3/1984 | Bichet | 156/475 |
| 4,609,518 | * | 9/1986 | Curro et al. | 264/570 X |
| 4,695,422 | * | 9/1987 | Curro et al. | 264/570 X |
| 4,772,444 | * | 9/1988 | Curro et al. | 264/557 |
| 4,778,644 | * | 10/1988 | Curro et al. | 264/557 |
| 4,927,733 | * | 5/1990 | Stout | 156/285 X |
| 5,158,819 | * | 10/1992 | Goodman, Jr. et al. | 264/557 X |
| 5,298,102 | * | 3/1994 | Pohl | 156/285 |
| 5,441,691 | * | 8/1995 | Dobrin et al. | 264/557 X |
| 5,520,875 | * | 5/1996 | Wnuk et al. | 264/557 X |
| 5,567,376 | * | 10/1996 | Turi et al. | 425/387.1 X |
| 5,824,352 | * | 10/1998 | Yang et al. | 425/387.1 X |

FOREIGN PATENT DOCUMENTS

| | | | | |
|---|---|---|---|---|
| 0 079 824 | * | 5/1983 | (EP) | 264/570 |
| 857323 | * | 12/1960 | (GB) | 156/285 |
| 52-72966 | * | 6/1977 | (JP) | 156/285 |
| 61-35203 | * | 2/1986 | (JP) | 156/214 |
| 61-179711 | * | 8/1986 | (JP) | 156/285 |
| 61-242825 | * | 10/1986 | (JP) | 156/285 |
| 61-242826 | * | 10/1986 | (JP) | 156/285 |
| 62-80025 | * | 4/1987 | (JP) | 156/285 |
| 62-287639 | * | 12/1987 | (JP) | 156/285 |
| 4-77205 | * | 3/1992 | (JP) | 264/510 |
| WO 90/14209 | * | 11/1990 | (WO) | 425/387.1 |

* cited by examiner

*Primary Examiner*—Adrienne C. Johnstone
(74) *Attorney, Agent, or Firm*—Summit Law Group

(57) ABSTRACT

A lamination process for orienting and conforming a film or sheet material to a substrate surface having a surface feature such that the film or sheet material reflects the surface feature includes interposing an adhesive between the film or sheet material and the substrate surface and opposing the film or sheet material and the substrate surface; providing at least two manifolds, where each manifold provides a plurality of flow streams of a pressurized liquid, each flow stream being oriented to effectuate a clear but minimally overlapped resulting flow stream from each manifold; and directing the resulting flow streams onto the film or sheet material to coincide at a contact nip line with at a force effective to conform the film or sheet material to the surface feature of the substrate surface. The resulting flow streams are maintained for sufficient time to adhere the film or sheet material to the substrate.

16 Claims, 4 Drawing Sheets

LAMINATION OF SURFACES USING PRESSURIZED LIQUID

FIELD OF THE INVENTION

The present invention relates to the field of lamination, and, more particularly, to a method and system for laminating a thin or flexible film or rolled sheet material to a substrate surface using the step of conforming the film or sheet to the substrate using a pressurized liquid.

BACKGROUND OF THE INVENTION

Lamination is commonly defined as a process of applying, in a relatively permanent manner, a thin film or sheet of material to an underlying substrate. Lamination has been used in single or multiple applications to either provide a surface finish different from the underlying substrate, or to provide additional protection to the underlying substrate, or to enhance certain properties of the underlying substrate. Examples of laminated products include snow and water skis, furniture, airplane interiors, etc. Historically, such processes have involved applications to substantially smooth surfaces, at the time of lamination. Vacuum press application and other laminating processes used for laminating to a substrate with a detailed, textured or embossed surface, which surface has multiple surface plane deviations, of differing heights and depths, suffer limitations particularly on a continuous manufacturing basis. While some technological advancements have been made in batch process lamination for finished pieces with textured surfaces, the process is very labor and time intensive, with resultant higher costs and lower output. There are significant cost advantages for a process that can provide the desired finish textured product in a continuous manufacturing process, but such processes have heretofore been unavailable.

Continuous laminating processes have used conforming pressures exerted by various types of rollers, to seal the laminate against the substrate. However, such processes are most suitable for use with substrates that are substantially smooth, flat or plane surfaces, and to some extent curved and angled surfaces. In the case of a solid roller system, a uniform or near uniform conforming pressure must be continuously exerted by the rollers (or set of rollers) in order to properly bond the film to the substrate. However, solid roller technology, while a continuous process, has the limitation of being incapable of the substantial pressure needed to force the film on and into a rough or textured substrate surface and of being inapplicable where the film or substrate will not tolerate the substantial pressure needed. Also, if the substrate has an embossed or textured surface, a solid roller may fail to adequately reflect or telegraph all details of the surface. Solid rollers are also incapable of providing differential pressures on a textured surface, and so can cause undue pressure to be exerted at high points of the substrate (damaging or compromising the adhesive film and/or substrate), and insufficient pressure in the low points (causing incomplete bonding of the film to the substrate). Thus, lamination with rollers typically results in uneven pressure distribution and uneven adhesion. Vacuum/bladder technology can be used to perform lamination of uneven surfaces, however, the technology can only be performed in a batch process, resulting in the low throughput and high costs, and, therefore, is limited to end products with a relatively high intrinsic value.

While laminating procedures may exist to apply film to flat, contoured and slightly uneven surfaced substrates, there has been no suggestion of previously known technology which provides the attributes and benefits of the current invention including the ability to laminate films or sheet to embossed or textured surfaces in a continuous process using pressurized liquid, with fine telegraphing of the surface.

The potential commercial value is enormous for a process that manufactures a laminated textured product in a continuous process. The current invention provides such a process and addresses the previously noted shortcomings or inadequacies in present laminating processes and technology.

SUMMARY OF THE INVENTION

The present invention provides a method and system for lamination that have unique advantages over prior processes in the art and particularly in regard to processes for continuous lamination (but can also be done in batch) of a substrate so as to finely and definitively reflect surface embossments or textures, without tearing or structurally compromising the laminating film or sheet. The underlying substrate and the laminating film or sheet is combined with (or without) chemical interaction to produce a material with structural or functional properties different from those of the individual constituents. The present invention also provides improved temperature control with superior quench attributes, competitive capital cost, high production level, flexibility in application and use, and cost effective operation. Along with the novel application of laminating material to an embossed or textured surface through the present invention, this invention can also be used for laminating to smooth, curved or angled surfaces, as well as to any surface of wide or narrow profile. The present invention also allows for wrapping of edges on a continuous production basis.

The invention comprises a method in which liquid, heated or cooled as necessary, is applied under pressure through a manifold system and by way of application nozzles to laminate the film or sheet to the underlying substrate. Several factors may be adjusted to optimize the application of the laminating film or sheet to the underlying substrate, depending on materials used, including: 1) the height and size of the manifolds and nozzles to adjust the liquid curtain or stream; 2) the angle of nozzles for application of the liquid pressure; 3) the temperature of the liquid, film and substrate; 4) the type of liquid used; 5) the type of adhesive used; 6) impact, which is a combination of pressure, flow rate and temperature; and 7) additives to the liquid to modify surface appearance and to provide definitive or desired characteristics. Variations in materials include the laminating film or sheet, underlying substrate and adhesive. Because the present invention allows for the relatively easy adjustment of these factors, the use and applicable materials is quite broad.

To further enhance the continuous process aspects of the present invention, various parts can be enhanced to improve operations or ensure the continuous nature, including using manifolds with a self-cleaning device to prevent blockage; installing the manifolds on movable shafts enabling the ability for the spray pattern to be moved on all axis to accommodate the most difficult of patterns, sizes or structures of the underlying substrate or desired end product; and operating the manifolds in such a manner as to activate specified nozzles or channels of nozzles to allow for selected or differential levels of lamination. An optional and additional feature of the present laminating process is integration of the process with a fluid collection and recycling system to further provide the user with the ability to capture and recover fluid used in the process for recycling, resulting in low fluid loss and high energy efficiency, particularly with heated liquids.

Combined with conventional pre-heating/cooling of the substrate and heating/cooling of the laminating film or sheet to meet defined parameters of the materials including the adhesive, the present invention has the ability to provide superior temperature control and quench facilities enabling the user to modify the processes to meet variables in the underlying substrate, adhesive and other materials, and still obtain a finished product with superior lamination even to a highly embossed or textured surface.

While laminating procedures may exist to apply film to flat, contoured and slightly uneven surfaced substrates, there has been no suggestion of previously known technology which provides the attributes and benefits of the current invention including the ability to laminate films or sheet to embossed or textured surfaces as a continuous process using pressurized liquid, with fine telegraphing of the surface.

DETAILED DESCRIPTION OF THE INVENTION

Figure 1A:
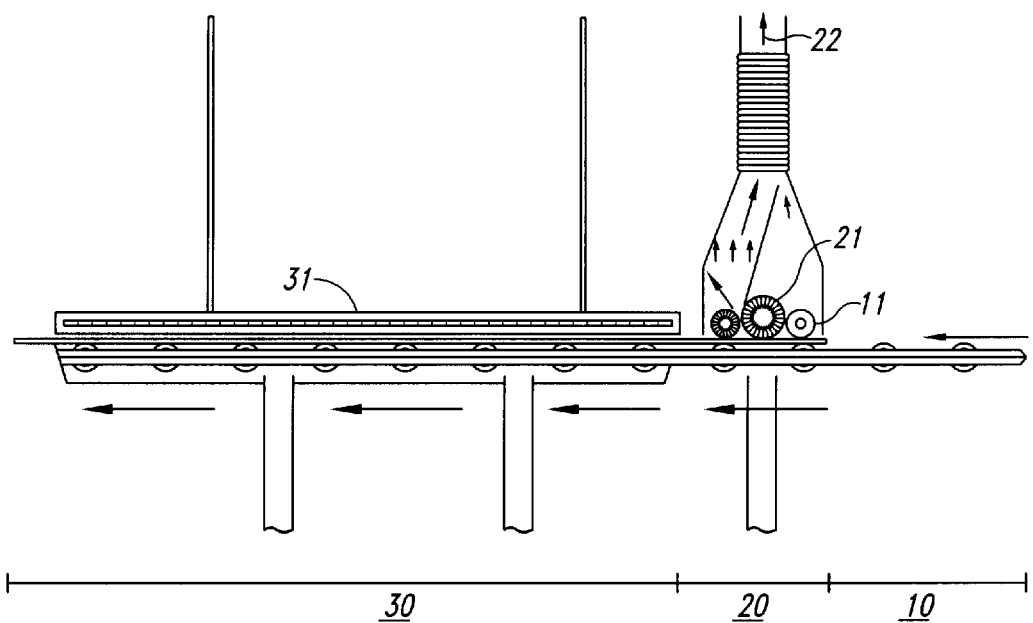
FIGS. 1a, 1b and 1c, combined, is a schematic drawing of the illustrative process using heating and adhesive application processes as examples only.

The method an system of the present novel invention provides for the lamination of a film or sheet material to a textured or embossed surface and eliminates or minimizes the stress and distortion of the film and/or underlying substrate associated with lamination to uneven, embossed or textured surfaces. Through the use of pressurized liquid, heated or cooled depending on the materials used, one can reorient the laminating film or sheet to intimately and simultaneously bond to the low and high points on the embossed or textured substrate surface, without compromise to the film in such a manner that causes tearing. Additionally, the use of pressurized liquid prevents damage to the underlying substrate's embossed or textured surface characteristics and of the underlying substrate structure itself. Relative liquid pressure, applied through manifolds can give point-to-point lamination capabilities that allow for nearly limitless response to the variabilities in the substrate surface. The present invention is limited only by the maximum extensibility of the film and, to some extent, film memory, which can be maximized or minimized, appropriately, through optimizing liquid temperature and pressure and combinations thereof.

The following examples utilize specific materials. It is understood that multiple types of substrates, laminating films or sheets and adhesives (or no adhesive) may be used in this process, therefore, this example is not meant to limit the scope of the process or application of the same. The substrate may be any solid, rigid to flexible material having a regular or irregular surface and capable of having a laminating material placed on it or adhered to its surface using pressurized liquid as the mechanism for applying the laminating film to the substrate. Such substrate can include, but are not limited to, smooth, rough or textured materials from wood of nearly any type or shape to other pulp-based products, to fiber cement and to Styrofoam and other synthetic materials, to glass, steel, metal, plastics, ceramics, polymers, synthetic polymeric foam, etc. One limitation of the process would be the physical properties of the laminating film or sheet and the substrate which can withstand the minimal amount of liquid pressure necessary to allow attachment or impression of the laminating material on the substrate, without compromising the structural integrity of the underlying substrate. Even such compromise may be a desirable outcome.

The process can be used to modify the surface of the film to mirror the surface of the substrate; alternatively, the process can be used to modify the surface of the film and/or the substrate to a pattern created by the pressurized liquid itself through the orientation or operation of the manifolds and nozzles. The pressurized liquid may create any pattern desired in the film and/or substrate using a film and/or substrate that will allow for permanent or relatively permanent impressions on the film and/or substrate. Examples of this alternative use of the present invention could be the creation, with the use of the pressurized liquid, of a pattern which gives a desired external finish, or one which allows for the formation of a mold used to produce a reverse image.

The laminating film or sheet is any material that can be applied to a substrate to provide a surface image or property modification of the substrate. Laminating films will usually have some level of flexibility or extensibility. Adhesives that may be used in the current invention to adhere the laminating film or sheet to the substrate, include, but are not limited to, pressure sensitive, chemically reactive, one part and two part, thermoset and thermoplastic adhesives. Whether or not heat is involved in the current process depends on the nature of the adhesive used and the properties of the laminating film or sheet. Additionally, it is understood that the laminating film or sheet, along with the underlying substrate can be of variable widths or lengths to fit the intended end-use or desired properties and function of the end-product.

The laminating film may be adhered to the underlying substrate in one continuous roll with the end-product being cut into desired sizes, shapes and lengths, or the end-product may be produced as a continuous process, but in essentially finished product lengths, shapes and sizes through the use of spacers, manifold orientation and accessory rollers.

In one presently preferred embodiment, a fluoropolymer material such as polyvinyl fluoride ("PVF") is used as the laminating film or sheet in the subject process. One representative example of PVF is sold under the trademark Tedlar® by E.I. DuPont De Nemours and Company, Wilmington, Del. PVF is manufactured as disclosed in U.S. Pat. No. 3,139,470 to Prengle, et al.; U.S. Pat. No. 3,228,823 to Usala et al.; and U.S. Pat. No. 3,963,672 to Brasure. PVF is illustrative of a lamination film useful in the current process, and it is understood that other film materials may be used. In a presently preferred embodiment, the PVF material is about one to two mils in thickness. Depending on the adhesive used, the underlying substrate and the laminating film must be capable of tolerating the temperature requirements for setting of the adhesive selected for use in the particular lamination process. Representative adhesives include temperature-activated adhesives, pressure-activated adhesives, contact cements, glues, one-part and two-part adhesives, chemically-reactive adhesives and the like. In a presently preferred embodiment, the adhesive is a temperature-activated adhesive. For purposes of this example, the pressurized liquid is water, but may be any liquid in its readily available form, or combination of such liquids or liquids and solids; a solid being such as an abrasive and in minor percentage to the total percentage.

Embodiments of the invention provide laminating processes for conforming a laminating film or sheet material to a substrate during the step of adherence of the one to the other through the application of a conforming pressure that is applied to the film or sheet by a pressurized liquid such as that delivered from a plurality of orifices such as high pressure jets, holes, slits, slots, and/or spray nozzles. "Conforming pressure" is used herein to refer to the physical unit of force applied per unit of surface area of laminant film or sheet material, e.g. gm/cm$^2$, while the film is being adhered to a substrate. In one preferred embodiment, the conforming pressure is "continuous", i.e., uniform in gm/cm$^2$ pressure value, and is applied for a time sufficient to ensure that the laminant film or sheet is continuously affixed to the surface of the substrate. In alternative embodiments, a "non-continuous" conforming pressure may be applied at different positions in the film, e.g., to conform the film to the surface texture of a substrate or to create texture in the film and/or the underlying substrate. Representative examples of non-continuous conforming pressures include, but are not limited to, rapidly pulsing on-off intermittent pressures, alternating high-to-lower pressures, alternating angles of the applied pressure (i.e., relative to the surface of the film), and the like. The flow of pressurized liquid from different orifices may be adjusted to give the same or different conforming pressures. The flow of pressurized liquid from a single orifice may be adjusted at different times in the process to give different conforming pressures. In one illustrative embodiment, the process of the invention may be used to create a texture on a smooth surface, e.g., by creating puckers, ridges and the like in the film or sheet material as it is in being affixed to the underlying substrate. The pressure itself can also give a possible desired form to the underlying substrate along with the laminating film. In another embodiment of the invention, the conforming pressure may be used to activate a pressure sensitive adhesive. In yet another embodiment of the invention, the subject conforming pressure is applied by the pressurized liquid to a release film in such a pattern as to apply pressure to pressure sensitive decals being applied to uneven surfaces, e.g. decals to vehicles.

The primary steps in a representative example of the current inventive process include infeed 10, surface cleaning 20, preheating 30, adhesive application 40, drying 50, heating 60, laminations of face 70, edge and back wrap 80 and take off 90 (FIGS. 1a, 1b, 1c):

1) If necessary, depending on the condition of the underlying substrate, one may include an initial surface cleaning step 20 to remove any foreign particles from the surface of the underlying substrate; such initial cleaning may be through the use of a vacuum, infeed grab roller 11, surface cleaning assembly 21 and vacuum exhaust 22 (FIG. 1a), brush or combination thereof. The initial cleaning step can be incorporated into the machinery that makes up the current process, or can be done separate and apart from the rest of the subsequent steps. In this example, all steps subsequent, or in accompaniment with this first step, occur on a continuous basis, with limitation on the speed of the process and end product output limited only by the speed of input of raw materials and initial bond needs of the adhesive. The process need not be interrupted for each piece of material that represents the individual end product or for the individual steps, which steps occur in continuous succession.

2) Next, the illustrative process uses substrate preheating 30 with infrared 31 (FIG. 1a), then adhesive application 40 using a surface coating spray system 41, 42 (FIG. 1b) to pre-coat at the substrate material with an even dispersion of the adhesive in such a manner as to wet all surface embossments, voids and impressions. The adhesive can, in the alternative, or in addition to, be applied to the film depending on the type of adhesive, laminating film, substrate and desired end products. However, care must be taken in applying the adhesive to the film to prevent any effect on the film by the adhesive such as modification of physical properties of the film that reduces flexibility of the film, unless such properties are desired. For this particular example, the adhesive was an acrylic polymer/epoxide resin derivative (specifically, DuPont De Nemours Part Nos. 68070, 68011 and 68060.) It is also understood that the method of application of the adhesive can be through spray, as described in this example, or through other mechanisms such as rollers and nip. It is also understood that the substrate and/or the laminating film may be preheated prior to application of the adhesive, again, depending on the properties and physical characteristics of the materials. Application sequence and temperature is dependent on raw material feed conditions. Many products soften when heated; for this reason, it is preferable to use both a heated substrate and heated film to aid the forming and adhesion process. The substrate is fed on a continuous conveyor comprising, for purposes of this example, a roller conveyor and a conveyor comprising two chains 82 with cleats (dogs) 74 attached to links at regular intervals to properly space the substrate. For this example, the conveyor is driven by a variable speed belt drive, with the chains 82 passing along a chain guide, holding each board in place by two cleats, pushing the material at a uniform speed. The conveyance system also contains an edge guide ensuring the correct board positioning on the continuous conveyor. Optionally, alternative chain drive 83, belt drive or other durable continuous conveying mechanisms can be used. It is understood that the conveyor system may be made of any accepted or standard system or material, including links, belts and chains. Similarly, the conveyor can be driven by any mechanism capable of providing adequate energy output. The type of conveyor system may vary depending on the substrate used, the environment or the materials available.

3) Next, the illustrative drying process 50 (FIG. 1b) uses a heating section to preheat the coated substrate from ambient temperatures to a temperature sufficient to dry the sprayed adhesive on contact and drive off any un-evaporated solvents which remain on the pre-coated surface (hood exhaust 51, FIG. 1b), due to the specific nature of the adhesive used in this illustration.

4) Next, for purposes of this example, the substrate is further exposed to infrared heating 61, or such other appropriate heating method that prepares the substrate for lamination of the laminating film or sheet, through the maximization of the adhesive properties for acceptance of the laminating layer and use of the pressurized liquid for intimately securing the laminating film onto the substrate surface. Due to the specific nature of the adhesive used in this example, the temperature should be in the range of 260 to 300° F., most preferably approximately 280° F. It is understood that the need for heating (or cooling) depends on the adhesive used, and possibly the film and substrate used, and if adjustment in temperature optimizes desired properties of any of these materials. Environmental conditions such as temperature and humidity may require adjustment.

5) Next, the laminating film or sheet is fed into the process from a separate source. Appropriate mechanisms, including, but not limited to, air breaks, drags systems, etc., are utilized to control the speed of feed of the laminating film to coincide with the continuous and ongoing feed of the substrate. The laminating film 62 (FIG. 1c) may pass through a preheating chamber 71 (FIG. 1c) or area, which allows for possible desirable re-orientation of the film, as well as, maximization of adhesive properties at the point when the substrate and film come into contact. The separate feed source (seal rollers 72, FIG. 1c), and, if necessary, the preheating chamber 71 (FIG. 1c), also provides for the flattening of the film and the removal of any surface distortions or lack of uniformity which can arise in shipping, storage and handling. The amount of heating necessary for the film is limited by the calorie retention of the film and the desired adjustment of the film. As described above, the adhesive may also be applied to the film instead of, or in addition to the application of the adhesive to the substrate. For this example, the film is heated to the same approximate temperature as the underlying substrate, using a combination of forced air heat 63 (FIG. 1c) and infrared heating 64 (FIG. 1c) to provide a uniform conditioning of the film and the substrate for optimal adhesive performance. It is understood that other mechanisms of heating may be used including radiant, forced air and infrared, or a combination of these for this step or any other step in the process.

Figure 1B:
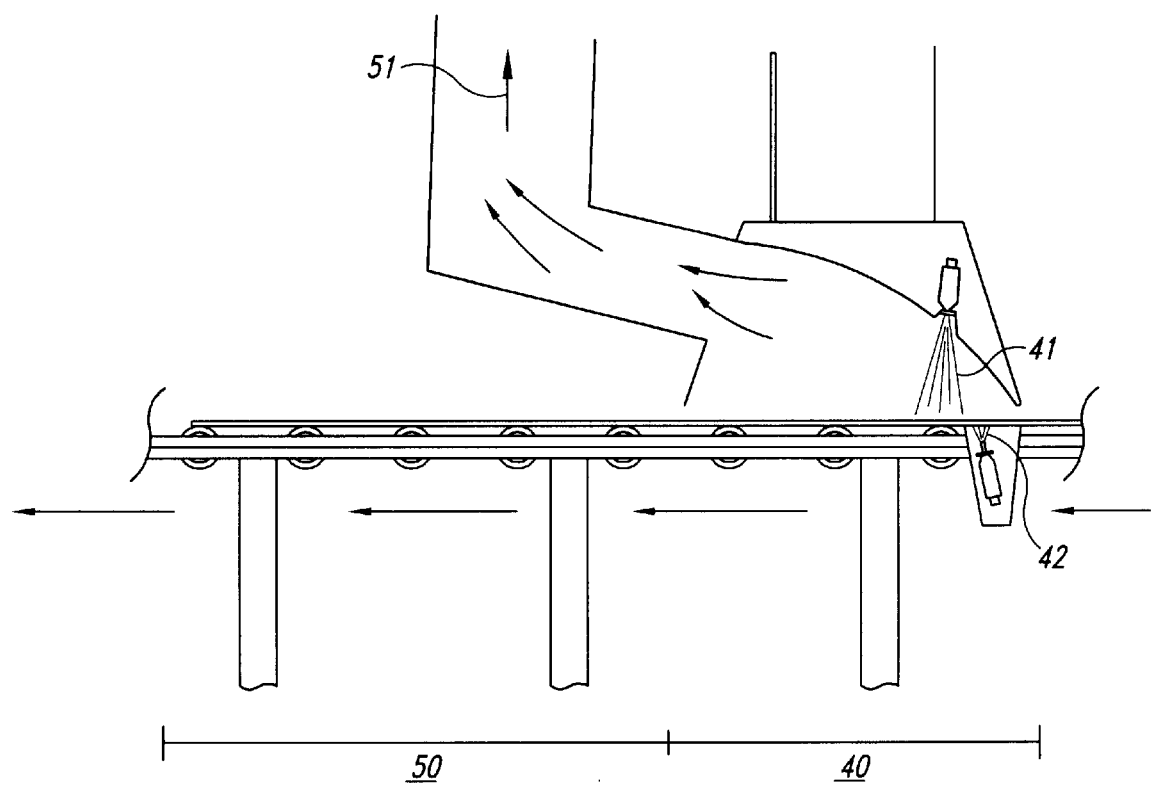
Figure 1C:
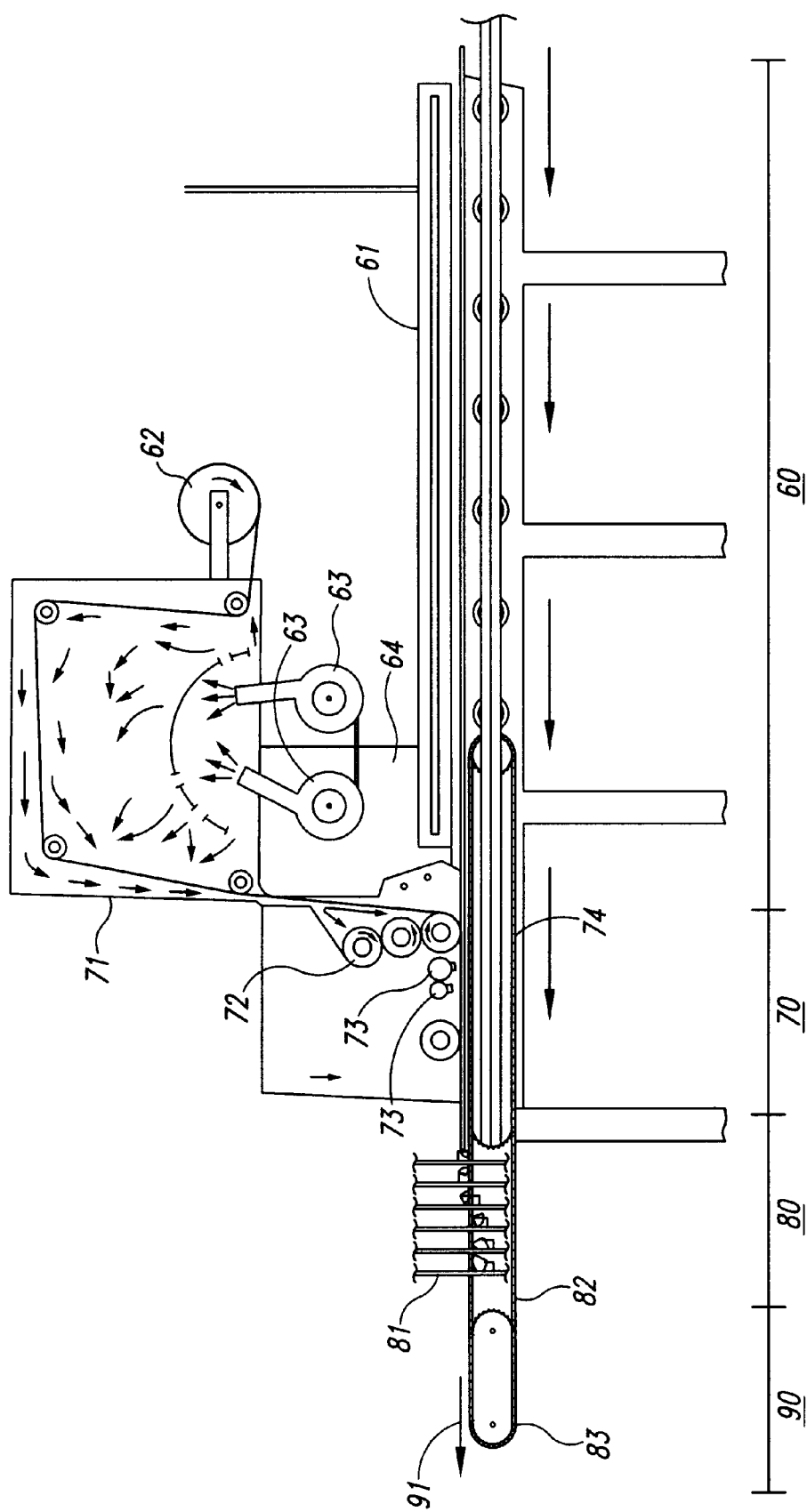
Figure 3:
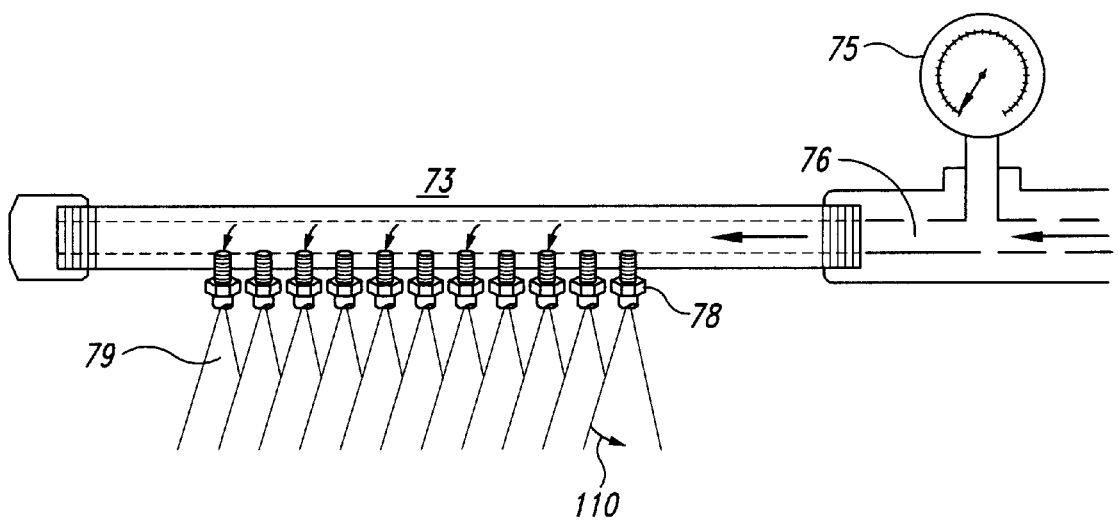
FIG. 3 is an illustrative example of the manifold with installed nozzles and spray pattern or path.
Figure 4:
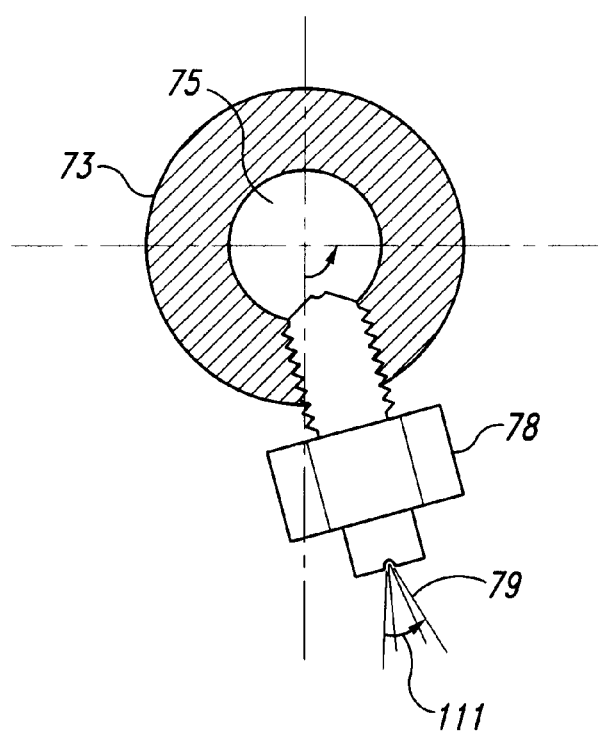
FIG. 4 is a cross section of an illustrative example of the nozzle configuration or placement in the manifold and spray pattern or path.
Figure 5:
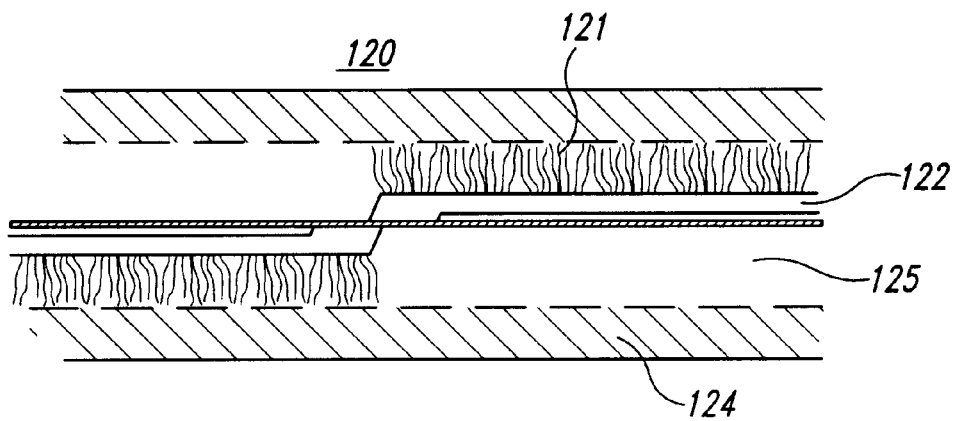
FIG. 5 is a cross section of an illustrative example of the self-cleaning manifold.

6) Next, the PVF film is applied to the substrate with the use of a pressurized curtain of heated water 70 (FIG. 1c). For purposes of this example, the heated water is supplied by using equipment manufactured by Hotsy Corporation of Englewood, Colo., specifically, part no. 1260. For this example, two manifolds 73 (FIGS. 1c and 3) are used containing twenty-two flat jet nozzles 78 (FIGS. 3 and 4) designed to provide a fifteen degree spray angle 111 (FIG. 4), set at one and ¾ inches above the surface of the substrate, with the nozzle angle on the manifold set marginally off perpendicular between the range greater than 0 degrees and about 89 degrees off the vertical position. In this example, the nozzle angle is set approximately four percent (4%) (FIG. 4) off perpendicular to facilitate clear but minimal overlap of the spray pattern 79 (FIGS. 3 and 4). The manifolds 73 (FIGS. 1c, 3 and 4) are set facing the direction from which the substrate is being fed, one manifold set at approximately 86° and the adjacent manifold set at approximately 77°, allowing the water curtain from each manifold to coincide at the contact nip line. The manifolds used in this example are manufactured by Spraying Systems Co. of Wheaton, Ill., part no. 1501 with a 15° angle and an orifice diameter of 0.026 inches. The height of the manifolds and nozzles provides for contact with the film surface that has been positioned appropriately directly above the substrate surface immediately prior to the manifold location. The manifolds are also positioned just beyond the point of any necessary heating of the substrate and/or film to accommodate any thermosetting or thermoplastic requirements of the adhesive. The minimal distance between the heating point and the manifold minimizes any loss in adhesion performance. In this example, each nozzle is installed in the manifold in such a manner that the distance from the nozzle face to the film and substrate is equal for each nozzle and the angle of the spray is set approximately four degrees off a straight line in order to optimize the spray curtain performance and eliminate and avoid loss of energy as a result of colliding spray patterns. It is understood that the manifolds and nozzles may be adjusted in multiple configurations and orientations to accommodate the particular film and/or substrate, the substrate surface characteristics or the desired characteristics and features of the end product. Additionally, the manifolds and nozzles may be of variable size and configuration, as well as made out a multiplicity of materials to suit a particular need or desired result. FIG. 3 provides an illustrative example of the manifold 73 with pressure gauge 75, pressurized liquid passage 76, installed nozzle 78 and spray pattern 79 (or path). FIG. 4 is a cross section of an illustrative example of the nozzle 78 placement and configuration in the manifold 73 and spray pattern 79 (or path). FIG. 5 is an illustrative example of a self-cleaning manifold 120 with stainless steel bristles 121, internal rotating brush-type cleaning assembly 122, pressurized liquid passage 125 and manifold wall 124.

In this example, nozzles 78 (FIGS. 3 and 4), with an orifice of 0.026 of an inch, are installed at 0.9 inch intervals on each manifold 73 offset to provide effective nozzle spacing when using two manifolds at 0.45 inches between discharge ports. The pressurized water is provided at a flow rate of approximately 1.1 gallons per minute per nozzle at pressures up to 3,000 psi. In this example, flow demand requires 2.2 gallons per minute for each 0.9 inches of coverage. Operated at 2800 psi at 200° F., the resulting downward pressure exerted by the pressurized water curtain will form the heated PVF film into the embossments, textures and surface characteristics of the underlying substrate, while preventing any damage to the laminating film or the underlying substrate. Pressures below 2800 psi were tested with varying temperatures; but none provided the desired performance results for this particular illustrative example.

The present invention allows for the extension or reorientation of the laminating film to the extent necessary to mirror the surface of the underlying substrate, but exerts no further pressure on the underlying substrate than necessary to allow the adhesion of the film to the substrate surface in such a manner to allow for the telegraphing of the surface features by the laminating film. This attribute of the present invention is particularly important as the pressurized liquid provides a fluid pressure to a general area versus a point specific pressure by a solid mechanical device, which the result of this is very evident when applied to certain substrates, for example fiber cement, which breaks down under pressure by a solid mechanical roller, which is unforgiving and results in inter-laminar bond failure. In contrast, the pressurized liquid provides no further pressure on the film than to adhere the film, without influencing the structure of the substrate through pressure. The present invention prevents this problem in traditional laminating processes through the even point-to-point pressure across the entire surface of the nip point, providing superior initial bond and, with the added benefit of quenching provided by the spray, and accelerated initial peel strength for certain adhesives. The maximum depth with which the laminating film may be extended to telegraph the substrate surface features depends on the extensibility of the film.

Previous lamination processes have required the use of additional equipment to hold the PVF film to the substrate surface contours until full bonding of the film to substrate was complete. The use of the pressurized liquid eliminates this requirement by permanently reorienting or modifying the film at the point of contact and initial adhesion at the liquid curtain nip point, thus, eliminating the need for the adhesive to overcome the stress created by internal resistance within the laminating film. In the inventive process, one embodiment of which is described in this example, no internal resistance remains in the film resulting in the ability to use lower tack adhesives with higher performance characteristics. The current process even allows for the reorientation of the film in reflection of the underlying substrate surface without the necessity of the use of adhesives. This provides greater operational flexibility and access to adhesives which have proven long term performance characteristics. Because of these unique properties associated with the current invention, a laminating film or sheet can be applied to almost any application, from bottles to siding material, provided the film and the substrate are not adversely affected by fluid pressure.

7) Next, the substrate is edge-wrapped and the back surface 80 (FIG. 1c) laminated to a degree sufficient to provide protection for the substrate generally depending on the end use needs of the substrate, such as, from environmental conditions. For this example, rubberized forming rollers 81 (FIG. 1c) are installed at various angles to direct the film against the edge and back of the substrate. This edge and back lamination is conducted immediately after the lamination of the surface and can also be completed by the use of pressurized liquid, in the manner of forming spray jets.

8) Next, the film is cut at substrate ends using a mechanical knife or a manual device, and take off is at 91 (FIG. 1c). Optionally, one can leave a protective tab at the end of the length of the laminated material.

Figure 2:
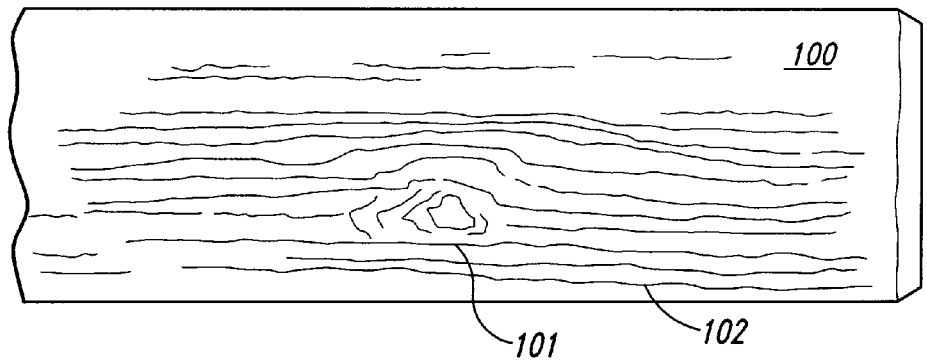
FIG. 2 is an illustration of a laminated surface resulting from the inventive process for siding applications.

FIGS. 1a through 1c, combined, provide a schematic of this illustrative process. FIG. 2 is an illustration of a laminated surface for siding applications resulting from the inventive process with face, both edges and partial back wrap having a 100% bond 102 to surface contour on embossed face 101 of panel 100.

It is understood that different heating and pressure configurations may be necessary depending on the characteristics of the film, the adhesive, the substrate and the configuration and specifications of the equipment. Heat activated adhesives have certain advantages over other adhesives since heat application facilitates the burn off of any excess chemicals which could become entrapped between the underlying substrate and the laminating film, causing blistering. Additionally, the use of heat-activated adhesives has proven long-term attributes and minimizes potential degradation of the bond between the laminating film and the substrate. The process line speed is geared to appropriate and timely temperature generation at the various steps of the process. The pressure settings of the pressurized liquid are dependent on the depth and complexity of the substrate surface.

What is claimed is:

1. A lamination process for orienting and conforming a film or a sheet material to a substrate surface having a surface feature in a manner effective to conform the film or sheet material to reflect said surface feature, comprising the steps of:

interposing an adhesive between the film or the sheet material and said substrate surface and opposing the film or the sheet material and the substrate surface the one to the other under conditions suitable for adhesion;

providing at least two pressurized manifolds, each said manifold providing a plurality of flow streams of a pressurized liquid delivered from their respective manifold, said flow streams being oriented to provide a clear but minimally overlapped resulting flow stream from each manifold;

directing the resulting flow streams of a pressurized liquid onto said film or said sheet material to coincide at a contact nip line, said resulting flow streams comprising a force effective to conform the film or the sheet material to the surface feature of the substrate surface; and, maintaining the resulting flow streams for a time sufficient and under conditions suitable for the adhesive to affix the film or the sheet material to the substrate.

2. The lamination process according to claim 1, wherein the film or sheet is made of polyvinyl fluoride (PVF).

3. The lamination process according to claim 2, wherein the PVF film has a thickness in the range of one to two mils.

4. The lamination process according to claim 1, further comprising the step of precoating the substrate surface with an even dispersion of the adhesive.

5. The lamination process according to claim 4, further comprising the step of preheating the coated substrate from ambient temperatures to a temperature sufficient to dry the adhesive.

6. The lamination process according to claim 5, further comprising the step of exposing the preheated, coated substrate to infrared heating prior to opposing the film or sheet and the substrate surface the one to the other.

7. The lamination process according to claim 6, wherein the infrared heating temperature is in the range of 260 to 300° F.

8. The lamination process according to claim 4, wherein the adhesive is one of the following: temperature-activated adhesives, pressure-activated adhesives, contact cements, glues, one-part or two-part adhesives, chemically-reactive adhesives, or acrylic polymer/epoxide resin derivatives.

9. The lamination process according to claim 1, further comprising the step of preheating the substrate or the film or sheet prior to interposing the adhesive.

10. The lamination process according to claim 1, further comprising the step of preheating the substrate and the film or sheet prior to interposing the adhesive.

11. The lamination process according to claim 1, further comprising the step of feeding the substrate on a continuous conveyor.

12. The lamination process according to claim 1, wherein each of the manifolds contains twenty-two flat jet nozzles.

13. The lamination process according to claim 12, wherein each jet nozzle provides a fifteen degree spray angle set off from perpendicular.

14. The lamination process according to claim 13, wherein each jet nozzle is set off from perpendicular 4 degrees.

15. The lamination process according to claim 1, wherein each manifold is oriented facing the direction that the substrate is being fed.

16. The lamination process according to claim 15, wherein there are only two of the manifolds and wherein one manifold is oriented at 86 degrees and the other is oriented at 77 degrees.

* * * * *